United States Patent
Sellschopp

(12) 
(10) Patent No.: US 9,177,475 B2
(45) Date of Patent: Nov. 3, 2015

(54) DRIVER BEHAVIOR BASED PARKING AVAILABILITY PREDICTION SYSTEM AND METHOD

(71) Applicants: VOLKSWAGEN AG, Wolfsburg (DE); AUDI AG, Ingolstadt (DE)

(72) Inventor: Stefan Sellschopp, Dachau (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 88 days.

(21) Appl. No.: 14/071,054

(22) Filed: Nov. 4, 2013

(65) Prior Publication Data

US 2015/0123818 A1    May 7, 2015

(51) Int. Cl.
| | | |
|---|---|---|
| *G08G 1/14* | (2006.01) | |
| *G01C 21/34* | (2006.01) | |
| *G01C 21/36* | (2006.01) | |

(52) U.S. Cl.
CPC ............ *G08G 1/143* (2013.01); *G01C 21/3484* (2013.01); *G01C 21/3685* (2013.01); *G08G 1/147* (2013.01)

(58) Field of Classification Search
CPC ......... G08G 1/14; G08G 1/141; G08G 1/143; G08G 1/144; G08G 1/145; G08G 1/147; G08G 1/148; G07B 15/02; G06Q 20/32; G01C 21/3484; G01C 21/3685

USPC ............. 340/932.2, 933, 937, 539.1, 539.11, 340/988, 990

See application file for complete search history.

(56) References Cited

U.S. PATENT DOCUMENTS

| | | | |
|---|---|---|---|
| 6,405,125 B1 * | 6/2002 | Ayed .............................. | 701/468 |
| 7,688,225 B1 * | 3/2010 | Haynes et al. ............. | 340/932.2 |
| 8,063,797 B1 * | 11/2011 | Sonnabend et al. ....... | 340/932.2 |
| 2002/0163444 A1 * | 11/2002 | Budnovitch ............... | 340/932.2 |
| 2007/0057817 A1 * | 3/2007 | Aman ........................... | 340/933 |
| 2012/0212353 A1 * | 8/2012 | Fung et al. .................... | 340/905 |
| 2012/0299749 A1 * | 11/2012 | Xiao et al. ................. | 340/932.2 |
| 2013/0024202 A1 | 1/2013 | Harris et al. | |
| 2014/0142805 A1 * | 5/2014 | Frye ................................ | 701/36 |

FOREIGN PATENT DOCUMENTS

| | | | |
|---|---|---|---|
| WO | 2005086097 A1 | 9/2005 | |
| WO | 2008140438 A1 | 11/2008 | |
| WO | 2011061028 A1 | 5/2011 | |
| WO | 2013086140 A1 | 6/2013 | |

\* cited by examiner

*Primary Examiner* — Hung T Nguyen

(74) *Attorney, Agent, or Firm* — Barnes & Thornburg LLP

(57) ABSTRACT

An in-vehicle parking system and method for displaying and analyzing parking information. The system displays information of available parking in the vicinity of a driver's destination. The system can provide personalized information, predictions and advisories to a particular driver because the system can learn the behavior of particular drivers over time.

24 Claims, 4 Drawing Sheets

DRIVER BEHAVIOR BASED PARKING AVAILABILITY PREDICTION SYSTEM AND METHOD

BACKGROUND

The present disclosure relates to a system, components and methodologies for improved presentation of available parking spaces. In particular, the present disclosure is directed to a system, components and methodologies that enable in-vehicle access to information from a plurality of parking information sources regarding the availability of parking spaces monitored by those sources.

The infrastructure for parking availability data is quickly developing in cities in the United States and elsewhere.

Conventional, real-time parking information is collected through sensors provided through systems such as Streetline or SFPark and aggregated to make availability information accessible to drivers. There are also some conventional approaches that correlate payment information with actual occupancy (e.g., ParkMe) or learn patterns of availability by interacting with a service (e.g., FasPark collecting information and enabling a user to search for parking using a mobile application).

In some cases, streets and parking garages are equipped with sensors that detect and report available parking spaces. However, the availability of parking data may not be generally known, and/or may be available from a plurality of sources and therefore difficult to compile, organize, and/or sort to reveal spaces that may be of interest to a particular driver on a particular occasion.

However, most geographical areas, and on most streets, there is still no real-time, parking availability information available to drivers.

Moreover, some of that data that is provided by these systems is updated only relatively infrequently, for example, on an hourly basis or more, while other data is kept current more frequently or even in real-time.

SUMMARY

According to the present disclosure, a parking assistant is provided that displays information of available parking in the vicinity of a driver's destination.

In illustrative embodiments, a parking availability information and prediction system may then use a parking availability model to analyze this data to generate parking availability information, predictions and advisories available for drivers.

In illustrative embodiments, the system can provide personalized information, predictions and advisories to a particular driver because the system can learn the behavior of particular drivers over time.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
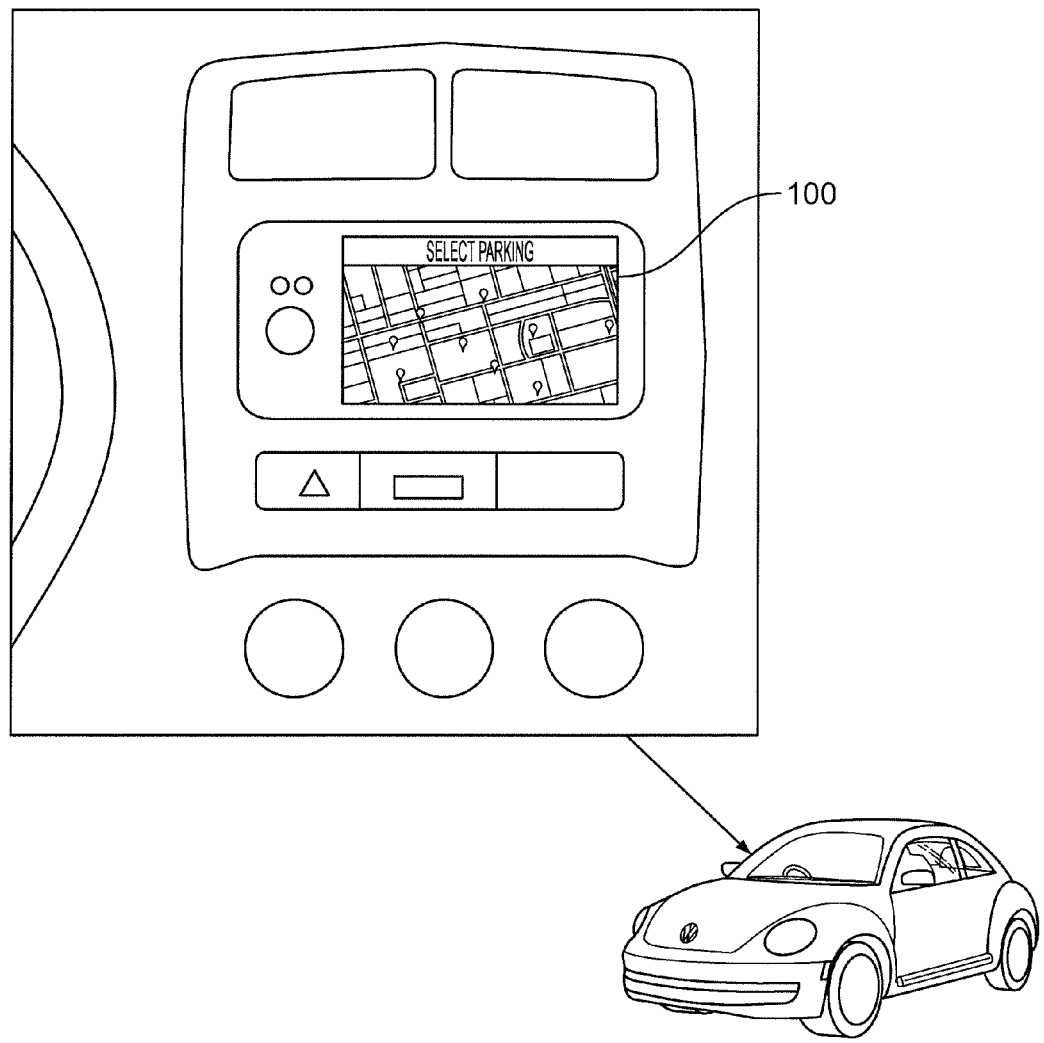
FIG. 1 is an illustration that includes an exemplary vehicle display presenting parking information in accordance with the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The technical challenge is to provide information on a driver's probability of where to find an open parking spot to the driver in an automated real-time manner and with wide geographic coverage without additional infrastructure investment. In accordance with disclosed embodiments, the automated mechanism to detect parking availability/probability of parking spaces is based on the behavior of the driver. This results in avoiding infrastructure expense.

Parking space availability data is a fairly new development. Depending on city and location, parking data may be made available online by a private parking lot or parking structure owner or operator, by a city in connection with city owned or regulated lots, on-street metered parking, etc. Such information may include, for example, an address of the facility and the total number of spaces provided, a fee schedule outlining the cost to park in a particular facility, hours of operation, etc. In addition, some facilities may be monitored, such as by attendants, cameras, or other sensors, and may be able to provide more complete parking information, such as a number of vacant spaces currently available, the general or specific location of the available spaces, how well-lighted particular spaces may be, etc. The facility owner/operator may make this information available to the public on a website for example, and perhaps via an application such as a smart phone app to visualize the currently available parking spots in a given area.

This information is simply informational, and does not provide the user with a recommendation regarding which spot may be preferred by the particular driver seeking the information. Further, because the information may be provided by a plurality of data sources that do not intercommunicate or cooperate, a driver remotely seeking a free parking space must look up each source of parking information individually in order to gather information of the available parking spaces in a given area. Parking data solutions heretofore have not provided for the user to define his/her personal preferences, nor can they help to filter or prioritize a list of parking spaces that are available from a plurality of sources or at a plurality of facilities.

In accordance with an illustrative embodiment, a driver behavior-based parking availability system and methodologies are provided that operate to better understand the normal driving behavior of a driver and learn when and where the driver starts to change his driving behavior based on his need to park the car. Such driving behavior may include driving data that indicates. The data may include historical data indicating where the driver has been driving, where the driver looked for parking and where he actually parked. This data may be collected over a period of time, stored and transmitted to a server and compiled with similar data from other driver's vehicles.

Optionally, a larger pool of data may provide a better understanding of parking behavior in a particular geographic area.

Alternatively, the pool of data may be grouped into subsets based on attributes of the driver or vehicle, e.g., an age of the driver or other personal data of the driver for example, gender or familial status, a size of the vehicle, or proximity to facilities in the geographic area, e.g., a sports stadium, a theater, a school, etc.

Optionally, the pool of data may be augmented, combined or analyzed in conjunction with conventionally available sources of parking data such Streetline, SFPark, ParkMe, FasPark, data from street and parking garage sensors, etc.

In accordance with an illustrative embodiment, a parking availability information and prediction system may then use a parking availability model to analyze this data to generate parking availability information, predictions and advisories available for drivers.

In accordance with an illustrative embodiment, the system can provide personalized information, predictions and advisories to a particular driver because the system can learn the behavior of particular drivers over time. For example, on-vehicle components of the system can monitor and track where a driver usually parks, where he usually is travelling to (based on an input destination in a navigation system of his vehicle), the speed(s) he usually drives and which lane he take when he is driving to a location versus looking for a parking spot, e.g., if a driver begins to drive in a right most lane in the United States and slows down (compared to cars around him), this may be analyzed as an indirect or inferential indication that the driver is searching for a parking spot.

Accordingly, a parking availability information and prediction system may gather and analyze the driving behavior of a plurality of drivers to learn driving patterns in the drivers' surroundings. This enables real-time and predictive parking information advisories without installing additional sensors in parking spots or driver's actively providing parking availability information.

Proper analysis of driver behavior is important to understand and provide prediction of parking spots for a particular driver. For example, suppose a driver chooses a destination and uses his vehicle navigation system to direct his driving to the specified location. When the driver approaches the destination, he slows down and looks for parking, which is an indication that the driver is looking for parking. Note, the determination of whether the driver has slowed his rate of travel may be made compared to his rate of travel before coming into proximity to the specified location and/or, optionally, compared to vehicles driving in surrounding traffic (data which may be optionally available to the system for analysis). Accordingly, a user's speed relative to his previous speed and/or relative to vehicles in surrounding traffic may be used to trigger an automated determination of parking availability/probability and output of generated data to the user.

Likewise, drivers are often looking for parking as indicated by movement of their head or eyes, e.g., from side to side. Thus, to the extent that a vehicle includes sensors that may register head movement of a driver, generated data indicating head or eye movement may be used to trigger an automated determination of parking availability/probability and output of generated data to the user.

Subsequent to the driver parking, the driver turns of his vehicle, which may trigger transmission of data monitored during the driver's trip to one or more servers of the parking availability information and prediction system. Optionally, the vehicle may send information about a part(s) of the driver's route beginning at the point at which the driver slowed down and including the location where the driver finally found a parking spot. For example, a driver may have initially reduced his speed because he saw a parking spot that was too small for his vehicle or had incompatible or unacceptable parking restrictions, e.g., handicapped parking, fire hydrant in parking space, loading zone, 30 minute parking, etc.

The parking availability information and prediction system must utilize a model or models that take into consider that driving at a reduced speed is different for each individual driver. Thus, for each driver going "slow" could mean something different (e.g., the relative speed difference to normal is variable); thus the model(s) utilized by the system are able to learn about different driver types (or sub-groups, e.g., aggressive, moderate, cautious) and analyze their behavior accordingly. Additionally, depending on how far the driver parks from his specified destination, the system's model(s) can learn that parking is difficult or easy at a particular time or day of the week (e.g., depending on how fast the driver found a parking spot and how close the found parking spot was to his destination).

In accordance with an embodiment, at least some data may be provided to the parking availability information and prediction system using drivers' mobile phones rather than in-vehicle components, e.g., the driver's vehicle infotainment system. By doing so, a larger pool of data may be available to the system for analysis because the data may be gathered using functionality provided on mobile phones and using a mobile application running on the mobile phone to transmit the data to one or more servers for the a parking availability information and prediction system. Additionally, the mobile application may be included in, work in conjunction with or cooperate with a mobile application that provides navigation assistance to the user.

For example, one set of analytics may define: if a driver drives 5-10 km/h less than the driver would usually do for every 200 m or up to the next intersection, the probability for this time of this week day will be lowered (e.g., if three vehicles have passed by, there is no parking available at all) for future predictions.

Optionally, whenever a vehicle has parked, data may be transmitted to a system server(s) that enables the system to determine that a driver has been successful at parking at this specific location at this time of this specific day. Alternatively, in a different situation, a user may approach his destination (without navigation support) and slow down to look for parking but be unable to find a spot. As a result, the driver may keep driving increase his vehicle speed again; this increase in speed could be analyzed and interpreted as an indication that the driver has given up locating a parking spot; alternatively, it may be an indication that the driver is attempting to drive back closer to his destination, at which he will slow his vehicle again and resume searching for a parking spot. Following location of a parking spot and the driver parking and turning off his ignition, information indicating this behavior could be sent to the parking availability information and prediction system server(s) for analyzes to model additional information about the parking availability along the driver's stretch of route while he was searching for parking. Optionally, that portion of the driver's route during which the driver sped up again may not be used to recognize parking spot searching behavior because it may be deemed to be re-approaching the destination.

Disclosed embodiments of the parking availability information and prediction system may provide a unified means for gathering together parking availability information from a plurality of sources and organize the parking availability information in a format that's easy to understand by the driver, and provide information, predictions and notifications regarding parking availability for the driver to review, potentially select (thereby triggering guidance instructions on approaching the selected area) and then proceed to that space to park there. This real-time parking information may be displayed as a color coded map, indicating probability to find parking in a certain period of time.

Disclosed embodiments provide a solution to the above-described technical problems by providing an in-vehicle system for obtaining information regarding a current need for a parking space, gathering parking information from a plurality of sources, optionally obtaining driver parking preference information, obtaining vehicle location information, analyzing these data, and providing information, predictions and notifications regarding parking availability for the driver to review.

Figure 3:
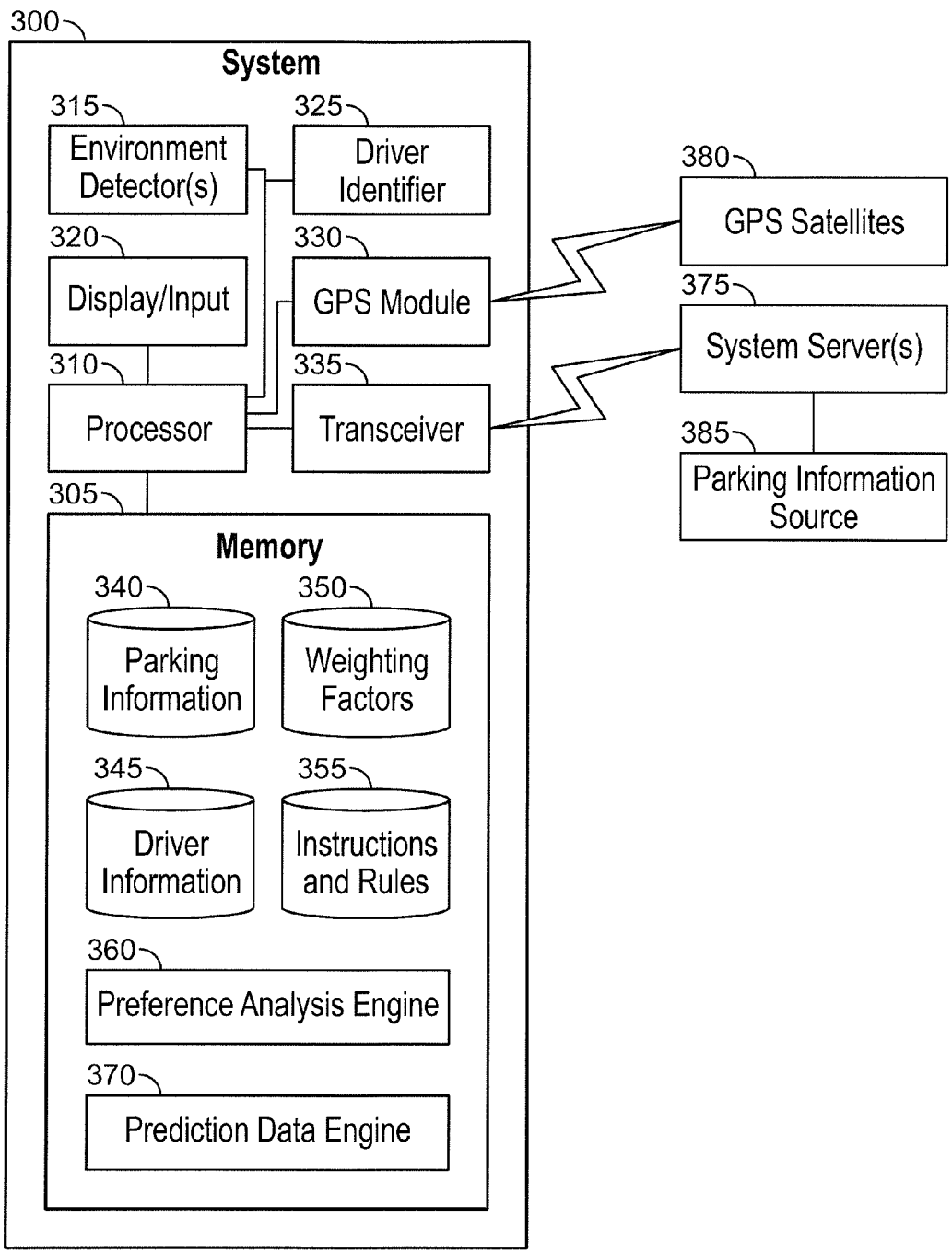
FIG. 3 is a block diagram of an exemplary personalized parking assistant in accordance with the disclosure.

FIG. 3 is a simplified block diagram of a system 300 that may be included in a vehicle driven by a driver and generating parking availability information, predictions and advisories available for the driver. In accordance with an embodiment the some or all of the components of system 300 are included within the vehicle itself. In accordance with an alternative embodiment, the components are at least partially or completely included in a mobile processing device, e.g., a special purpose computer or a mobile phone of the driver.

System 300 is controlled primarily by computer readable instructions, which may be in the form of software stored on a tangible data storage device 305 (hereinafter "memory"), such as a magnetic disk hard drive, solid state drive, optical disk, and/or high-speed read only memory (ROM), random access memory (RAM) or the like. In an embodiment, RAM may temporarily store instructions and data retrieved from slower storage devices that is needed for current operations, where it can be quickly read and processed by the processor or other hardware devices.

The instructions may be executed by a tangible processor 310, such as a microprocessor, to cause system 300 to perform tasks. In operation, processor 310 fetches and executes instructions and information, and generates and transfers information to and from other resources coupled to or in data communication with the processor.

In addition, system 300 may contain one or more environment detectors 315, such as a thermometer, hygrometer, barometer, wind speed meter, etc., for detecting environmental conditions. A clock may also be included for determining time-based information, such as a time of day, a duration, a day of the week, etc. Further, a receiver operative to obtain information from a remote source, such as a weather service that broadcasts weather conditions and forecasts, may be included as well. System 300 may also contain display device 320 to present visual output generated by the processor or a display controller. Such output may include text, graphics, and video, for example. Display 320 may be implemented with an LCD-based touch sensitive flat-panel display operable to receive input such as driver selections, text on a virtual keyboard, or the like. Alternative or additional input and output devices may also be included, such as a microphone and speech recognition software for receiving input, a speaker and speech producing software for providing output, etc.

Further, system 300 may contain a driver identifier 325 for identifying the driver. The identifier may be or include a key fob or key containing electronics that have been identified in the system with a particular driver, a camera and face recognition software, a driver position setting control that identifies a select collection of settings with a driver, or the like. Likewise, the identifier may include a mechanism for receiving a user identification code and password and receiving validation of the user identification code and password. A global positioning system (GPS) module 330 may be included in the system that is operable to determine a geographic position of the vehicle, such as by communicating with a plurality of GPS satellites and triangulating the vehicle's position based on the satellites' respective positions. GPS module may include map data, and the system may be operable to correlate the position data with the map data to show the position on a map. The system may also include transceiver 335, operable to communicate directly or indirectly with parking facilities and/or other sources of information regarding parking space availability. The transceiver may be, for example, a cellular transceiver in data communication with a cellular communication system (not shown). Alternatively, the transceiver may be operative to establish a Bluetooth®, wife, near-field, or other data communication connection with the driver's cellular telephone (not shown) or the like.

Memory 305 may include one or more databases for storing information. In embodiments, the stored information may include parking information, 340, driver information 345, weighting factors 350, and instructions for performing tasks and rules (e.g., prediction rules for a predictive model), as will be described.

In an embodiment, certain instructions when executed on the processor, in combination with other information such as information stored in the memory, obtained from one or more of the devices coupled to the processor, or the like, may implement preference analysis engine 360 and prediction data engine 370, as will be described.

Some drivers may prefer a certain type of parking, such as on-street parking, metered parking, or an outdoor lot, and a covered parking structure, valet parking, etc., when looking for a parking space near their destination. Thus, in accordance with an embodiment, a driver's personal parking preferences may be taken into account.

Driver's personal parking preferences may be influenced by different factors. Such factors can include, for example, the traffic patterns common to a particular area and/or a particular time of day, the character of the neighborhood, the price to park, covered or uncovered, attended or not, the duration of parking needed, the distance from a parking space to a final destination, and the amount of time remaining between the time a vehicle is parked and the beginning of an appointment or reservation. In addition, parking space selection can be influenced by factors other than the driver's personal preferences, such as a street sweeping schedule, tow away rules and zones, neighborhood character, etc. Additionally, characteristics of the driver may be taken into consideration including physical characteristics such as a physical handicap, age, gender, etc.

Some or all of the above mentioned factors and/or other factors, in addition to the availability of parking spaces, may influence a driver's decision on where to park. In accordance with an illustrative embodiment, the herein disclosed apparatus, systems, and methods disclose a computing-based, automated, real-time, parking availability prediction system 300 can take into account the preferences and parking selection history of specific drivers over time, combine that information with information of a current destination and information of currently available parking spaces obtained remotely, to generate real-time parking space prediction notifications and/or list in a likely driver preference order of predicted available parking spaces near the destination.

In exemplary aspects, the system may be operative to analyze a parking space selection pattern of the driver over time which then can be used to customize parking prediction data and notifications for future navigation requests. Such data collection may be done either actively or passively. If actively for example, the driver may input information into the system pertaining to a need to park at a destination, and use the system to obtain information of available parking spots around the destination. Parking space selection information such as the parking location, facility type, and distance to the destination, along with other available weighting factor data regarding the selected space, may be saved in a database for analysis. If passively for example, even when the driver does not actively engage the system to provide real-time parking space prediction data or notifications, the system itself, or the system via an interface to a distinct vehicle navigation system, may still monitor where the car is parked, using GPS module 330 for location data for example. By correlating the geographic location with map data, the parking space the car is parked in may be identified and stored. The same information as in the active case may be saved and added to the parking database for analysis. System 300 may analyze the parking information stored in the parking database in accordance with instructions 355, taking into account one or more driver-input or automatically detected preferences stored with driver information 345, in view of applicable weighting factors 350. The system may then notify, via a prediction data engine 370 one or more likely available parking spaces in response to a current parking need, sorted and presented in accordance with the preferences of the current driver and current destination.

The parking availability information and prediction system may obtain the identity of the current driver from driver identifier 325, for example, using information from a camera, from a key or key fob that has been associated in the stored driver information with that driver, or using another method of identifying the driver, such as a driver input control. Illustratively, such an input control may be associated with a control used by the driver to set and select a collection of car interior settings, such as driver seat height and position, mirror positions, and the like. The parking assistant may create a distinct profile for each different identified driver, and store parking information in association with respective drivers' parking events.

Optionally, the system may begin gathering, storing, and analyzing data of a driver's parking selections whenever a new driver is identified to the system. Such analysis may be performed by preference analysis engine 360. Optionally, the most recent data of each identified driver's parking selections may be weighted more than data which is older, so that parking recommendations include updated driver preferences. In addition, parking information may be correlated with, or otherwise analyzed in conjunction with, information may be available from environment detector 315 regarding environmental conditions that may affect a driver's choice of parking. Such information may include current or forecasted precipitation, current traffic information, news of an event that may affect traffic or parking availability such as road construction, an increased parking cost at a favored facility, or the like. Such information may be incorporated into the parking recommendation, and/or may be presented to the driver in conjunction with or in addition to the presentation of parking recommendations.

In embodiments, system 300 may be able to detect and make recommendations appropriate to situations such as scheduled meetings and other appointments. For example, the vehicle' infotainment head unit (HU) may contain or be coupled to the system, and the HU or the system may also be coupled to a driver's smartphone containing the driver's calendar. The parking assistant may then access the calendar and thereby become aware of the driver's scheduled meetings and appointments. Parking availability information and prediction notifications may then automatically take into account the time remaining until the appointment begins, the distance from available parking spots to the final destination, and the like, for example.

Weighting factors may be stored by system 300 in weighting factor information 350, and used in making parking recommendations may include a price of parking. Weighting factors may be obtained by driver input, such as by prompting the driver to input preferences directly into the system. Alternatively, weighting factors may be determined by monitoring and analyzing in preference analysis engine 360 factors indicative of driver preferences. For example, the system may be able to determine that the driver routinely selects from among the least expensive parking spaces available, and may then recommend available spaces with the lowest cost in the area. Or, the system may determine that the driver routinely selects from among the spaces closest to the destination without regard to cost, and then recommend available spaces closest to the destination. The system may be operative to detect one or more thresholds, such as a parking price threshold, a distance from destination threshold, or the like, and take those factors into account in making recommendations.

Environmental factors such as the current weather may be detected from environmental detectors 315, and/or may be obtained from a weather service broadcast or response to a query or the like, and may be included in the recommendation calculus. Further, the weather that is forecasted to arise during or after a scheduled appointment or the like may be included. For example, current or forecasted rain might change the preference relationship between the cost to park and the distance to the destination, indicating a preference to park close to the destination in the presence of rain even if it is more expensive than a farther space that would otherwise be preferred. Other environmental factors considered may include other information obtained remotely such as the current traffic flow at the destination or along a calculated route to the destination.

Weighting factors may also include time-based constraints. For example, if the intended duration of the parking stay at the location is known, for example from the calendar of the driver, the system may filter out parking availability information and prediction notifications for parking spaces or areas which may result in penalties when parking there for the intended duration. Such factors may include, for example, metered parking limitations, parking rate schedules with abrupt increases, tow away zones that incur a risk of being towed when parking there but which may still be preferred for short duration parking, street sweeping schedules, parking garage closing times, and the like.

Figure 2A:
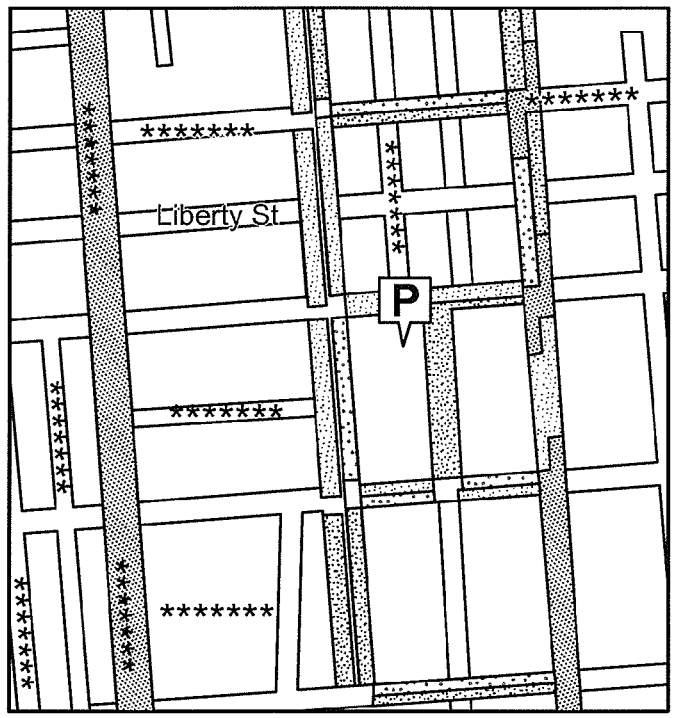
FIGS. 2A and 2B are exemplary presentations of parking information and menu items that may be presented on the display of FIG. 1, in accordance with the disclosure.
Figure 2B:
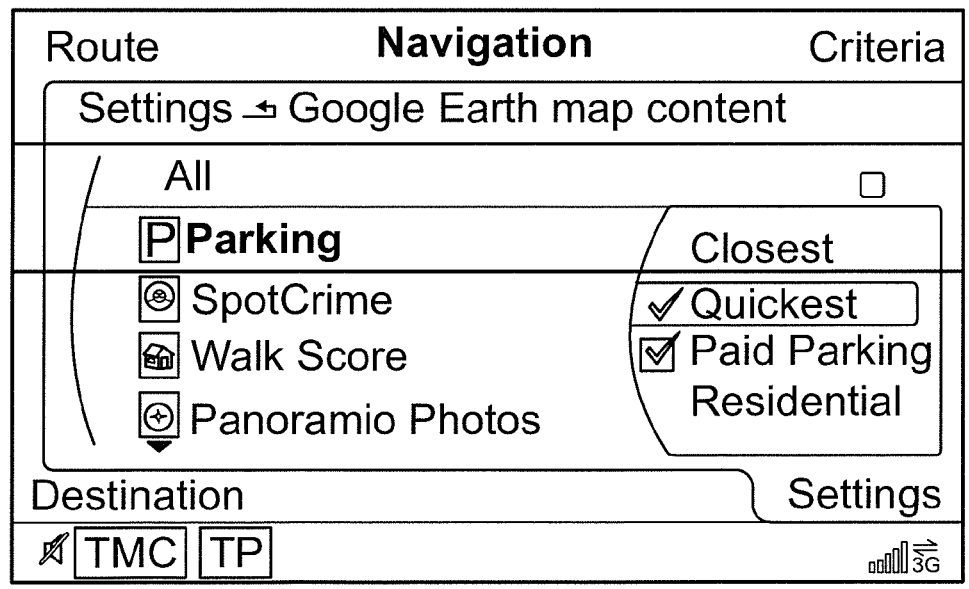

In embodiments, system 300 may obtain available parking space information from any available recognized source, normalize the information obtained into a comparable basis for analysis and/or a consistent format for presentation, compile the results, and filter and/or rank available parking spaces near the destination in accordance with the preferences of the current driver, and present the results in an easy to understand format. For example, parking availability information and prediction data may be presented on a map as in FIG. 2A, and/or a driver may be provided with a menu of selection options in a list as in FIG. 2B, either of which may be selected by the driver for viewing. In an embodiment, the map or list may be presented on a touch sensitive display 100 of an in-vehicle infotainment system, as shown in FIG. 1. The driver may select a preferred geographic area, such as by touching the touch sensitive display 100, 320. The system, or a navigation system with which it interfaces, may then calculate and present driving directions to the selected area. Further, the presentation of available parking may be updated automatically as updated parking availability information becomes available. The system may notify the driver of the availability of updated parking information, or may provide updated notifications based on newly available data. If the driver selects a different geographic area based on the newly available data, the system may modify the driving directions to lead to the newly selected space.

Over time, the system may monitor the driving of the driver and spaces selected by the driver, analyze the selections, and use the result of the analysis to improve notification recommendations in the future, thereby improving the quality of the data provided to the driver.

Figure 4:
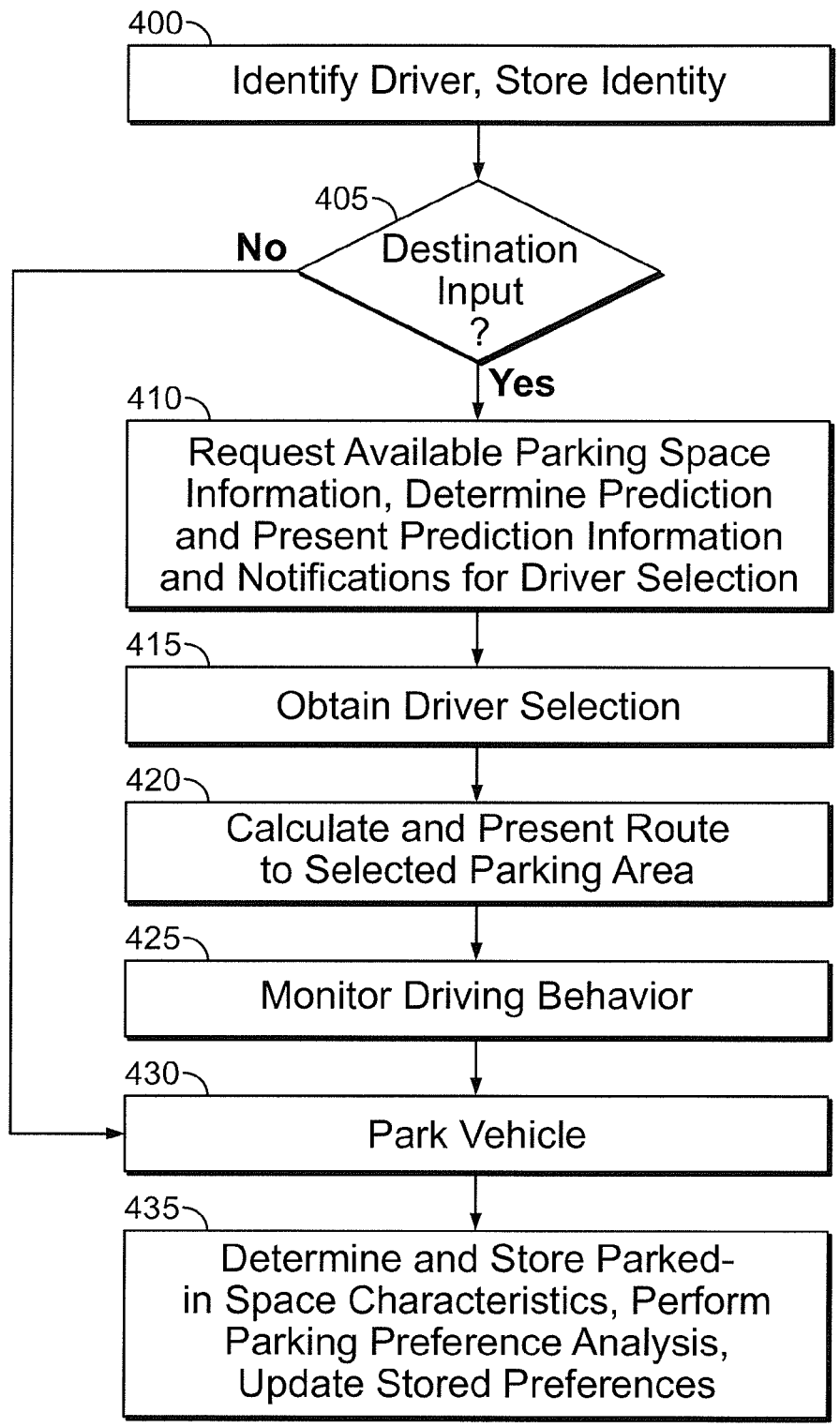
FIG. 4 is a flow diagram of an exemplary method of providing parking assistance in accordance with the disclosure.

FIG. 4 is a flow diagram of an exemplary method for doing so. As shown, the driver is identified, and the identity is stored, 400. The driver may input a destination, 405. If not, the system may simply monitor for behavior indicating that the driver is looking for a parking space at 430 parking availability information and prediction system at which the vehicle is parked by the driver. However, if the driver does input a destination, the system may request available parking space prediction information from the system server 375 illustrated in FIG. 3. This information may be generated when the system server 375 is utilized to run parking availability information and prediction model(s) based on data from remote sources 385 illustrated in FIG. 3.

The system may optionally take into consideration personal preferences of the driver when providing parking availability information and prediction notifications, and present the parking availability information and/or prediction notifications for driver selection, 410. The system may then obtain the driver's area selection and optionally provide navigation instructions to the driver for arriving at the selected area.

Following output of parking availability information and/or prediction notifications to the driver, e.g., through display/input 320 of FIG. 3, the system receives the input driver selection of a specific area of predicting parking spaces at 415. The system then works in cooperation with a navigation system to calculate and present a route(s) to the selected area at 420. Once at the selected area, the driver's behavior is monitored to further improve the parking availability information and prediction system modeling at 425.

Subsequently, parking of the vehicle is detected at 430 and, following turning off of the vehicle, the system may optionally determine, store and optionally transmit to the system server(s), characteristics of the selected parking space for analysis to further improve the parking availability information and prediction system model(s). For example, the system may determine and store the distance from the selected parking space to the input destination, the current temperature, precipitation, wind speed, and the like, whether the selected space is under cover, etc. The system may then optionally use that information to perform a parking preference analysis for the driver and optionally update the stored driver preferences.

In an embodiment, a driver may input a preference for specific features of a preferred parking environment. The system may store those features as parking preferences and/or weighting factors, search for such features in remotely obtained parking space information, monitor for the presence of such features when the vehicle is parked, and use such features in parking event analyses and generating parking prediction information and prediction notifications. Such features may include, for example, whether a space is a designated handicap space, or a designated compact or non-compact car space, for example. Other such features may include the height of a ceiling in a covered parking facility, the presence of pylons, columns, or the like near to or adjacent to a parking space, the presence of lighting and/or other security features, the proximity to stairways, elevators, or exits, and/or any other feature of a parking environment that may be desired by the driver.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. A driver behavior based parking availability prediction system, comprising:
 a processor in data communication with:
  a graphical display device, a driver identifying device, a driver input device, a transceiver operative to communicate with multiple sources of parking space information, a global positioning system (GPS) module, and a non-transitory data storage device on which is stored computer code which, when executed on the processor, implements:
 a parking information database that stores information indicating at least one of an available parking space, and a parking space the vehicle has been parked in;
 a weighting factor database that stores weighting factor information;
 a driver preference database that stores driver preference information;
 a parking preference analysis engine,
 a parking prediction data engine; and
 instructions which, when executed on the processor, cause the system to:
 identify the driver,
 obtain from the driver a destination where a parking space is needed;
 request current information of available parking spaces proximate the destination from multiple sources of parking space information, and receive the requested information;
 notify, using the parking recommendation engine, parking space prediction information including one or more likely available parking spaces and prediction notifications based on the destination, the current information of available parking spaces, and the driver preference information, and
 present the parking space prediction information and prediction notifications on the display; and
 means for gathering information of the driving behavior of the driver while he is looking for the parking space, information of the parking space in which identified driver parks, means for analyzing the drivers' selection of parking space parked in, and means for adapting a parking availability model used to generate the parking space prediction information and prediction notification.

2. The system of claim 1, wherein the driver preference database includes information gathered by querying the driver.

3. The system of claim 1, wherein the driver preference database includes information gathered automatically pertaining to the driver's driving behavior when approaching a parking space that the driver parks in.

4. The system of claim 3, wherein the driver's driving behavior when approaching a parking space that the driver parks in is utilized along with such driving behavior from other drivers to provide a parking availability model that generates parking availability information, predictions and advisories.

5. The system of claim 1, wherein the information of the parked-in spaces includes at least one of a characterization of the neighborhood parked in, a time of day, a duration, and a price for the parking, a street sweeping schedule, a tow-away rule, a distance from a final destination, a weather condition, a start time of an event associated with the driver's parking, and a vehicle passenger identity, at least a portion of which is stored in the weighting factor database as weighting factor(s).

6. An in-vehicle personalized parking system, comprising:
a tangible processing unit processor in data communication with:
a graphical display device, a transceiver operative to communicate with multiple sources of parking space information, a global positioning system (GPS) module, a driver identifying device, a driver input device, an environment detecting module, and a non-transitory data storage device on which is stored computer code which, when executed on the processor, implements:
a parking information database that stores information of at least one of a parking facility and a parking space the vehicle has been parked in;
a weighting factor database that stores weighting factor information;
a driver information database that stores drivers' identities and respective preference information;
a driver parking preference analysis engine that analyses respective drivers' parking preferences based on information of respective parking events;
a parking prediction data engine; and
instructions which, when executed on the processor, cause the vehicle to:
identify a driver driving the vehicle;
request current information of available parking spaces proximate the destination from multiple sources of parking space information, and receive the requested information;
notify, using the parking recommendation engine, parking space prediction information and prediction notifications based on the destination, the current information of available parking spaces, and the driver preference information; and
present the parking space prediction information including one or more likely available parking spaces and prediction notifications on the display; and
means for gathering information of the parking space in which identified driver parks, means for analyzing the drivers' selection of parking space parked in, and means for adapting a parking availability model used to generate the parking space prediction information and prediction notification.

7. The system of claim 6, further comprising instructions which, when executed on the processor, cause the vehicle to obtain from the driver a destination where a parking space is needed.

8. The system of claim 6, further comprising instructions which, when executed on the processor, cause the vehicle to:
prompt the driver for parking preference information and receive the driver's responses; and
store the responses as driver preference information.

9. The system of claim 6, wherein the information of the parked-in spaces includes at least one of a characterization of the neighborhood, a time of day, a duration, a price for parking, a street sweeping schedule, a tow-away rule, a distance from a final destination, a weather condition, a start time of an event associated with the driver's parking, and a vehicle passenger identity, as weighting factor(s).

10. The system of claim 6, wherein the driver identifying device includes one of a key fob, a camera, a driver selection control of the vehicle, and a mechanism for receiving a user identification code and password and receiving validation of the user identification code and password.

11. The system of claim 6, wherein the driver information database includes information gathered by querying the driver.

12. The system of claim 6, wherein the driver information database includes information gathered automatically pertaining to the driver's driving behavior when approaching a parking space that the driver parks in.

13. A vehicle that includes the system of claim 6.

14. A method of providing parking prediction data based on driver behavior, the method comprising:
obtaining an identity of a driver driving a vehicle via a driver identifying device, and storing the identity in a driver information database on a tangible storage device in data communication with a tangible processing unit (processor);
monitoring driving behavior of the driver to determine when the driver is looking for a parking space;
obtaining current parking space information from at least one source of parking space information when the monitored driving behavior indicates that the driver is looking for a parking space;
outputting parking space prediction information and/or prediction notifications on a display based on a destination identified by the driver, the current parking space information, and driver preference information for the driver, and
gathering information of the parking space in which identified driver parks;
analyzing the drivers' selection of parking space parked in adapting a parking availability model used to generate the parking space prediction information and/or prediction notification based on that analysis;
wherein the behavior of the driver monitored is one of a head movement, eye movement, or reduction in speed.

15. The method of claim 14, further comprising:
detecting a parking event in which the vehicle being driven by the driver has been parked, and obtaining and storing information of the parking event;
analyzing the stored parking event information to determine parking preferences of the driver; and
storing the parking preferences in association with the driver's identity,
wherein the obtaining, detecting, analyzing, and storing are repeated for a plurality of driving occurrences.

16. The method of claim 14, further comprising:
- detecting a current location of a driver's vehicle using a global positioning system (GPS) module;
- storing information in a parking information database, the stored information indicating at least one of an available parking space, and a parking space the vehicle has been parked in;
- storing weighting factor information in a weighting factor database;
- storing driver preference information in a driver preference database;
- obtaining, from the driver, the destination where a parking space is needed; and
- requesting current information of available parking spaces proximate the destination from the at least one source of parking space information, and receive the requested information.

17. The method of claim 14, further comprising:
- prompting the driver for parking preference information and receiving the driver's responses; and
- storing the responses as driver preference information.

18. The method of claim 14, wherein the information of the parking event includes at least one of a characterization of the neighborhood, a time of day, a duration, a price for parking, a street sweeping schedule, a tow-away rule, a distance from a final destination, a weather condition, a start time of an event associated with the driver's parking, and a vehicle passenger identity, as weighting factor(s).

19. The method of claim 14, wherein the driver identifying device includes one of a key fob, a camera, and a driver selection control of the vehicle.

20. The method of claim 14, further comprising:
- storing weighting factor information; and
- using the stored weighting factor information in the analyzing the stored parking event information to determine parking preferences of the driver.

21. The method of claim 20, wherein the weighting factor information includes at least one of a characterization of a neighborhood, a time of day, a duration, a price for parking, a street sweeping schedule, a tow-away rule, a distance from a final destination, a weather condition, a start time of an event associated with the driver's parking, and a vehicle passenger identity.

22. The method of claim 14, wherein the driver preference information includes information gathered automatically pertaining to the driver's driving behavior when approaching a parking space that the driver parks in.

23. The method of claim 22, wherein the driver's driving behavior when approaching a parking space that the driver parks in is utilized along with such driving behavior from other drivers to provide a parking availability model that generates parking availability information, predictions and advisories.

24. The method of claim 1, wherein the current information of available parking spaces includes current information of available parking spaces at more than one parking facility.

* * * * *